US009218310B2

(12) United States Patent
Barroso et al.

(10) Patent No.: US 9,218,310 B2
(45) Date of Patent: Dec. 22, 2015

(54) SHARED INPUT/OUTPUT (I/O) UNIT

(71) Applicant: GOOGLE INC., Mountain View, CA (US)

(72) Inventors: Luiz Andre Barroso, Los Altos, CA (US); James Laudon, Madison, WI (US)

(73) Assignee: Google Inc., Mountain View, CA (US)

( * ) Notice: Subject to any disclaimer, the term of this patent is extended or adjusted under 35 U.S.C. 154(b) by 363 days.

(21) Appl. No.: 13/835,000

(22) Filed: Mar. 15, 2013

(65) Prior Publication Data

US 2014/0281107 A1 Sep. 18, 2014

(51) Int. Cl.
G06F 13/40 (2006.01)
G06F 13/38 (2006.01)

(52) U.S. Cl.
CPC ............ G06F 13/4045 (2013.01); G06F 13/38 (2013.01); *G06F 2213/0026* (2013.01)

(58) Field of Classification Search
CPC ..... G06F 13/36; G06F 13/40; G06F 13/4265; G06F 2213/0026; G06F 3/0634; G06F 13/385
See application file for complete search history.

(56) References Cited

U.S. PATENT DOCUMENTS

| 5,123,107 | A | 6/1992 | Mensch | |
|---|---|---|---|---|
| 7,228,375 | B1 | 6/2007 | Jacobson | |
| 8,521,941 | B2 * | 8/2013 | Regula | 710/313 |
| 2009/0222592 | A1 * | 9/2009 | Anderson et al. | 710/8 |
| 2009/0268738 | A1 * | 10/2009 | Tchapda | 370/392 |
| 2010/0306416 | A1 * | 12/2010 | Watkins | 710/5 |
| 2011/0029710 | A1 * | 2/2011 | Matthews et al. | 710/311 |
| 2011/0069710 | A1 * | 3/2011 | Naven et al. | 370/395.3 |
| 2012/0131201 | A1 * | 5/2012 | Matthews et al. | 709/226 |
| 2012/0297379 | A1 * | 11/2012 | Anderson et al. | 718/1 |
| 2014/0068317 | A1 * | 3/2014 | Kanigicherla et al. | 714/2 |

OTHER PUBLICATIONS

"QorIQ DPAA Primer for Software Architecture", Freescale Semiconductor, White Paper, Document No. QORIQDPAAWP, Rev. O, Jun. 2012, 39 pages.
"QorIQ T Series T4240/T4160 Processors", Freescale Semiconductor, Inc., QorIQ Communications Platforms, 2012, 2 pages.
Thadani, et al, "An Efficient Zero-Copy I/O Framework for UNIX®", Sun Microsystems Laboratories, Inc., TR-95-39, May 1995, 19 pages.
"Marvell 88NV9145", Marvell Semiconductor, Inc., Dec. 2011, 2 pages.

* cited by examiner

*Primary Examiner* — Glenn A Auve
(74) *Attorney, Agent, or Firm* — Brake Hughes Bellermann LLP

(57) ABSTRACT

A system includes a bus, a processor operably coupled to the bus, a memory operably coupled to the bus, a plurality of input/output (I/O) devices operably coupled to the bus, where each of the I/O devices has a set of control registers, and a first shared I/O unit operably coupled to the bus. The first shared I/O unit has a plurality of shared functions and is configured to perform the shared functions, where the shared I/O functions are not included as functions on the I/O devices and the I/O devices and the processor interact with the first shared I/O unit to use one or more of the shared functions performed by the first shared I/O unit.

20 Claims, 6 Drawing Sheets

SHARED INPUT/OUTPUT (I/O) UNIT

TECHNICAL FIELD

This description relates to systems and methods for efficient input/output (I/O) operations.

BACKGROUND

Modern computer system may include multiple input/output (I/O) devices. For example, a typical computer server system may include a single chip or multi-chip symmetric multiprocessor (SMP) that uses chip multiprocessors (CMPs) with both integrated and external I/O devices. The I/O devices may connect to the processors and memory using an I/O interconnect such as, for example, PCI-Express (PCIe). Examples of I/O devices in the computer server system may include disk controllers, disks, flash controllers, solid state drives (SSDs), high-speed networking components, universal serial bus (USB) controllers, universal asynchronous receiver/transmitter (UART) controllers, and other devices. In these computer systems, each I/O device may be a separate entity on the I/O interconnect. While the I/O devices may perform various different functions, each of the I/O devices may include the same or a similar set of functions on the devices, which may be inefficient. Data movement in the computer system also may be inefficient. It may be desirable to have a computer system with more efficient I/O operations.

SUMMARY

This document describes systems and techniques for input/output (I/O) operations among multiple input/output devices and a processor or a multiprocessor (e.g., a symmetric multiprocessor (SMP) unit). A system may include a shared I/O unit that combines multiple shared I/O functions as part of the shared I/O unit, where the shared functions are removed from each of the I/O devices. The shared I/O unit may be a separate component in the system or may be a part of the processor or the multiprocessor. In this manner, functions that may be common to the multiple I/O devices may be removed from the I/O devices and instead performed by the shared I/O unit. The processor and the I/O devices may interact with the shared I/O unit and use the shared I/O unit to perform one or more of the shared functions. The I/O devices and the processor or the multiprocessor may interact as peers on the bus using the shared I/O unit. The I/O devices may retain a set of control registers and other components to perform functions specific to the particular I/O devices.

According to one general aspect, a system includes a bus, a processor operably coupled to the bus, a memory operably coupled to the bus, a plurality of input/output (I/O) devices operably coupled to the bus, where each of the I/O devices has a set of control registers, and a first shared I/O unit operably coupled to the bus. The first shared I/O unit has a plurality of shared functions and is configured to perform the shared functions, where the shared I/O functions are not included as functions on the I/O devices and the I/O devices and the processor interact with the first shared I/O unit to use one or more of the shared functions performed by the first shared I/O unit.

According to another general aspect, a system includes a bus, a multiprocessor having at least two processors, the multiprocessor operably coupled to the bus, a memory operably coupled to the bus, a plurality of input/output (I/O) devices operably coupled to the bus and a first shared I/O unit operably coupled to the bus. The first shared I/O unit includes a plurality of shared functions and is configured to perform the shared functions, where the I/O devices and the multiprocessor interact with the first shared I/O unit to use one or more of the shared functions performed by the first shared I/O unit. The shared I/O functions include one or more interrupt controllers, one or more I/O memory management units (MMUs), and a plurality of data queues.

According to another general aspect, a method for performing input/output (I/O) operations among a plurality of I/O devices includes receiving data at a system, where the system includes a bus, a processor operably coupled to the bus, a plurality of I/O devices operably coupled to the bus and a shared I/O unit operably coupled to the bus, where the shared I/O unit includes a plurality of shared functions. The method includes communicating the data between one or more of the I/O devices, the processor and the shared I/O device and performing one or more of the shared functions on the data by the shared I/O unit.

According to another general aspect, a system includes means for communicating (e.g., a bus), means for processing (e.g., a processor) operably coupled to the means for communicating, means for storage (e.g., a memory) operably coupled to the means for communicating, a plurality of input/output (I/O) devices operably coupled to the means for communicating, where each of the I/O devices has a set of control registers, and a means for sharing I/O functions (e.g., a shared I/O unit) operably coupled to the means for communicating. The means for sharing I/O functions has a plurality of shared functions and is configured to perform the shared functions, where the shared I/O functions are not included as functions on the I/O devices and the I/O devices and the means for processing interact with the means for sharing I/O functions to use one or more of the shared functions performed by the means for sharing I/O functions.

The details of one or more implementations are set forth in the accompanying drawings and the description below. Other features will be apparent from the description and drawings, and from the claims.

DETAILED DESCRIPTION

Figure 1:
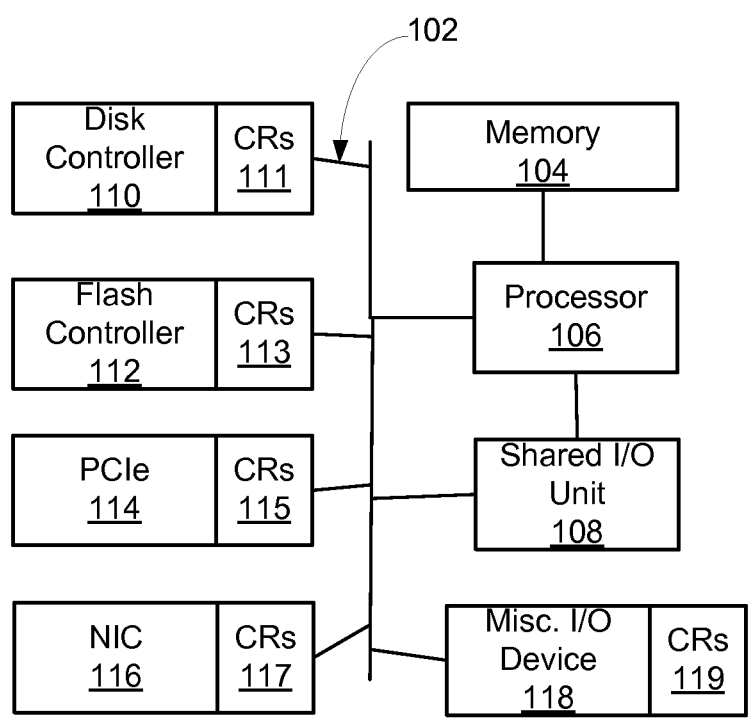
FIG. 1 is an example block diagram of a system having a shared input/output (I/O) unit.

FIG. 1 is an example block diagram of a system 100. The system 100 includes a bus 102, a memory 104 operably coupled to the bus 102, a processor 106 operably coupled to the bus 102, multiple input/output (I/O) devices operably coupled to the bus 102 and a shared I/O unit 108 operably coupled to the bus 102.

In some example implementations, the system 100 may be an integrated circuit that integrates all of the components of the system on a single chip (e.g., system on chip (SOC)). In some example implementations, the system 100 may be a system on multiple chips where the components of the system may be on multiple different chips. For example, each of the components of the system 100 may be on a separate chip. In other examples, some of the components of the system 100 may be on one chip and other components may be on separate chips.

In one example implementation, the system 100 may be used to receive data, process the data, and/or send the data (or processed data) to another component or system. For example, the system 100 may be in communication with a network (e.g., a wired or wireless network) and may receive data from another component or system over the network. The system 100 may manipulate the data using one or more of the components, including the processor 106. The system 100 may send the data, including the manipulated or processed data, to another component or system such as, for instance, a storage device (e.g., a flash memory storage device, a disk-based storage device, etc.) or other type of device or system.

In one example implementation, the system 100 may be used in a computing device such as, for instance, a computer, a server, a laptop, a notebook, a tablet, a mobile device, a smart phone or other type of computing device. The system 100 may include all of the components (including others not illustrated) needed to function as a complete computing device such as a server or other computing device. In other implementations, the system 100 may be a component in a computing device that works in cooperation with other systems and components in the computing device.

In the system 100, the bus 102 may operably connect the other components of the system 100 to enable communication between the components. The bus 102 enables data to be transferred between the components of the system 100. The bus 102 may be any type of interconnect including a serial bus, a parallel bus, a proprietary bus, and an I/O interconnect (e.g., peripheral component interconnect express (PCIe)).

In the system 100, the memory 104 may be configured to store one or more pieces of data, either temporarily, permanently, semi-permanently, or a combination thereof. Further, the memory 104 may include volatile memory, non-volatile memory or a combination thereof. The memory 104 or a portion of the memory 104 may be configured as a storage device that is configured to store instructions for execution by the processor 106. The instructions may be machine executable instructions or pieces of software, firmware or a combination thereof. The memory 104 may be a non-transitory storage medium.

The processor 106 may be configured to execute one or more machine executable instructions or pieces of software, firmware, or a combination thereof. For example, the processor 106 may be configured to execute the instructions stored in the memory 104. The processor 106 may include a single processor or may include multiple processors, as illustrated and described in more detail below. The processor 106 may interact with the other components of the system 100 to process data and to cause the other components to perform one or more actions.

The system 100 may include multiple I/O devices. As illustrated in FIG. 1, the system 100 includes a disk controller 110 having control registers 111, a flash controller 112, or a controller for other high performance non-volatile storage devices, having control registers 113, a PCIe controller 114 having control registers 115, a network information controller 116 having control registers 117, and a miscellaneous I/O device 118 having control registers 119. The I/O devices 110-118 may be integrated I/O devices or may be external I/O devices. Each of the I/O devices 110-118 includes a set of control registers 111-119. The individual sets of control registers 111-119 may include configuration information particular to the I/O device that it is a part of to enable the I/O device to function as programmed and desired.

In a typical configuration, I/O devices may have functioned as a separate, self-contained component within a system. That is, each of the I/O devices may have included all of the functions needed to perform its particular function including a set of functions that may be common to each of the I/O devices. In system 100, the I/O devices 110-118 may not function as a self-contained component within the system 100. The system 100 includes a shared I/O unit 108 that is configured to have a set of shared functions. The set of shared functions may not be included on each of the individual I/O devices 110-118 and may be removed from each of the I/O devices 110-118. In this manner, the I/O devices 110-118 interact with shared I/O unit 108 for use of the one or more of the set of shared functions. The set of shared functions may be in a single location on the shared I/O unit 108 for the components of the system 100 to use. In other example implementations, the set of shared functions may be distributed across multiple locations.

In the illustrated example of FIG. 1, the shared I/O unit 108 is illustrated as a separate component on the bus 102. In other example implementations, as illustrated and described in more detail below, the shared I/O unit 108 may be a part of another component such as, for example, the processor 106. The processor 106, along with the I/O devices 110-118, may interact with the shared I/O unit 108 to use one or more of the shared functions performed by the shared I/O unit 108, whether the shared I/O unit 108 is a separate component on the bus 102 or whether the shared I/O unit 108 is part of another component such as the processor 106.

Figure 2:
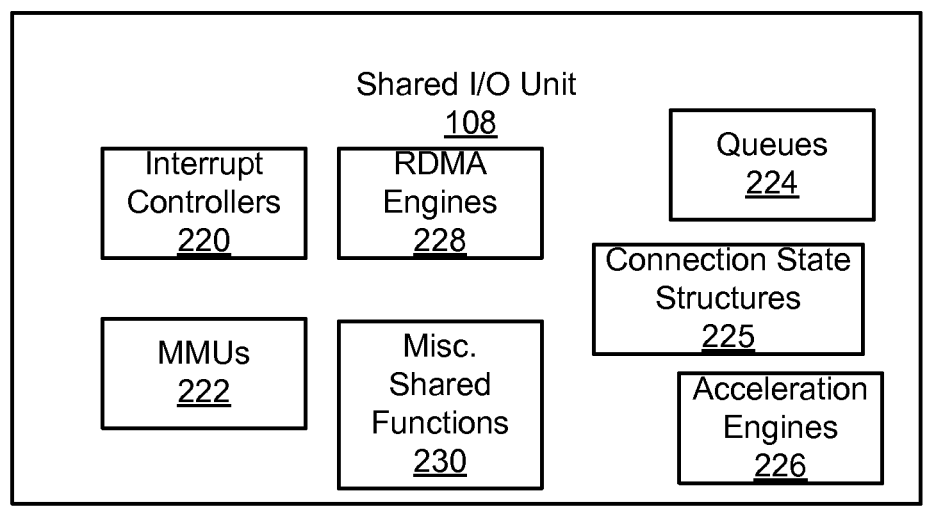
FIG. 2 is an example block diagram of the shared I/O unit of the system of FIG. 1.

Referring also to FIG. 2, an example block diagram of the shared I/O unit 108 is illustrated. The shared I/O unit 108 may include multiple shared functions that are performed by one or more components or blocks that are part of the shared I/O unit. Throughout this description and the claims the term shared functions and the term shared components may be used interchangeably to mean the same thing recognizing that it may be a shared component on the shared I/O unit 108 that is performing the shared function. The shared functions are located at a single location as part of the shared I/O unit 108. The shared functions include one or more interrupt controllers 220, one or more memory management units (MMUs) 222, one or more queues 224, one or more connection state structures 225, one or more acceleration engines 226 and one or more RDMA engines 228. The shared functions also may include other miscellaneous shared functions 230.

The shared functions 220-230 on the shared I/O unit 108 also may be referred to as shared common interfaces. In this manner, the shared common interfaces have been removed from the individual I/O devices 110-118 and located in a single location on the shared I/O unit 108. The shared interfaces enable the I/O devices 110-118 and the other components of the system 100, including the processor 106, to receive data, process the data, and/or send the data (including the processed data) in a more efficient manner than if the common interfaces were located on each of the individual I/O devices 110-118.

In one example implementation, the shared interrupt controllers 220 on the shared I/O unit 108 may perform interrupt control functions for the I/O devices 110-118. The I/O devices 110-118 may not include interrupt controllers having interrupt control functions and instead may use the shared interrupt controllers 220 having interrupt control functions. In this manner, the processor 106 also may interact with and use the shared interrupt controllers 220 on the shared I/O unit 108.

In one example implementation, the shared MMUs 222 on the shared I/O unit 108 may perform memory management functions for the I/O devices 110-118. The I/O devices 110-118 may not include MMUs having memory management functions and instead may use the shared MMUs 222 having memory management functions. In this manner, the processor 106 also may interact with and use the shared MMUs 222 on the shared I/O unit 108.

In one example implementation, the shared queues 224 on the shared I/O unit 108 may perform queuing functions for the I/O devices 110-118. The I/O devices 110-118 may not include queues having queuing functions and instead may use the shared queues 224 having queuing functions. In this manner, the processor 106 also may interact with and use the shared queues 224 on the shared I/O unit 108.

The I/O devices 110-118 may include buffers (not shown) on each individual device. The buffers on each I/O device 110-118 may be configured to assist with data flow control and latency to assist with proper data flow through the system 100.

In one example implementation, the shared connection state structures 225 (also referred to as queue pair structures) on the shared I/O unit 108 may perform connection-related functions for the I/O devices 110-118. The I/O devices 110-118 may not include connection state structures having connection-related functions and instead may use the shared connection state structures 225 having connection-related functions. In this manner, the processor 106 also may interact with and use the shared connection state structures 225 on the shared I/O unit 108. For example, the shared connection state structures 225 may include metadata information about a particular logical connection between communicating units or endpoints. An endpoint can be a process running in a computer node processor, a networking controller, a storage controller or other type of controller.

In one example implementation, the shared acceleration engines 226 on the shared I/O unit 108 may perform acceleration functions for the I/O devices 110-118. The I/O devices 110-118 may not include acceleration engines having acceleration functions and instead may use the shared acceleration engines 226 having acceleration functions. In this manner, the processor 106 also may interact with and use the shared acceleration engines 226 on the shared I/O unit 108.

In one example implementation, the shared RDMA engines 228 on the shared I/O unit 108 may perform RDMA functions for the I/O devices 110-118. The I/O devices 110-118 may not include RDMA engines having RDMA functions and instead may use the shared RDMA engines 228 having RDMA functions. In this manner, the processor 106 also may interact with and use the shared RDMA engines 228 on the shared I/O unit 108.

In one example implementation, the shared miscellaneous functions 230 on the shared I/O unit 108 may perform one or more various miscellaneous functions for the I/O devices 110-118. The I/O devices 110-118 may not include one or more of these miscellaneous functions and instead may use the shared miscellaneous functions 230. In this manner, the processor 106 also may interact with and use the shared miscellaneous functions 230 on the shared I/O unit 108.

In one example implementation, the system 100 and the use of the shared I/O unit 108 may enable the more efficient movement of data between the components of the system 100 and may reduce the overhead associated with having multiple copies of each of the shared functions on each of the I/O devices 110-118. For example, data may be received from a component or system outside of the system 100. The data (e.g., data on a network) may flow into the network information controller 116 and into the shared queues 224 in the shared I/O unit 108. If the received data requires processing, then the processor 106 may access the data from the shared queues 224 and perform processing on the data. Then, the processed data may be moved to the shared queues 224 and then may be streamed out of the shared queues 224 by one of the I/O devices such as, for example, the disk controller 110 if the data is to be moved to disk-based storage, the flash controller 112 if the data is to be moved to flash memory, or by the network information controller 116 if the data is to be moved to another component on the network. If the received data does not require processing, then the data may be moved directly by one of the RDMA engines 226 to a desired location in coordination with one of the other I/O devices 110-118.

In this manner, the data movement into the system 100, between the components of system 100 and out of the system 100 is more efficient and streamlined because of the use of the shared functions on the shared I/O unit 108. Less copying of data may need to occur by using the shared I/O functions on the shared I/O unit 108. Less interrupts may be needed because the interrupt processing is coordinated for the I/O devices 110-118 by the shared interrupt controllers 220. The number of compute cycles and other processing overhead may be reduced by using the shared I/O functions on the shared I/O unit 108.

In other example implementations, the shared functions of the shared I/O unit may be distributed across multiple locations. For example, one or more of the shared functions may be in one shared I/O unit in one location and the other shared functions may be in another shared I/O unit in another location. For instance, the shared RDMA engines and shared acceleration engines may be in one shared I/O unit in one location and the other shared functions may be in a different shared I/O unit in a different location. In some implementations, the shared functions may be distributed in more than two locations.

Figure 3:
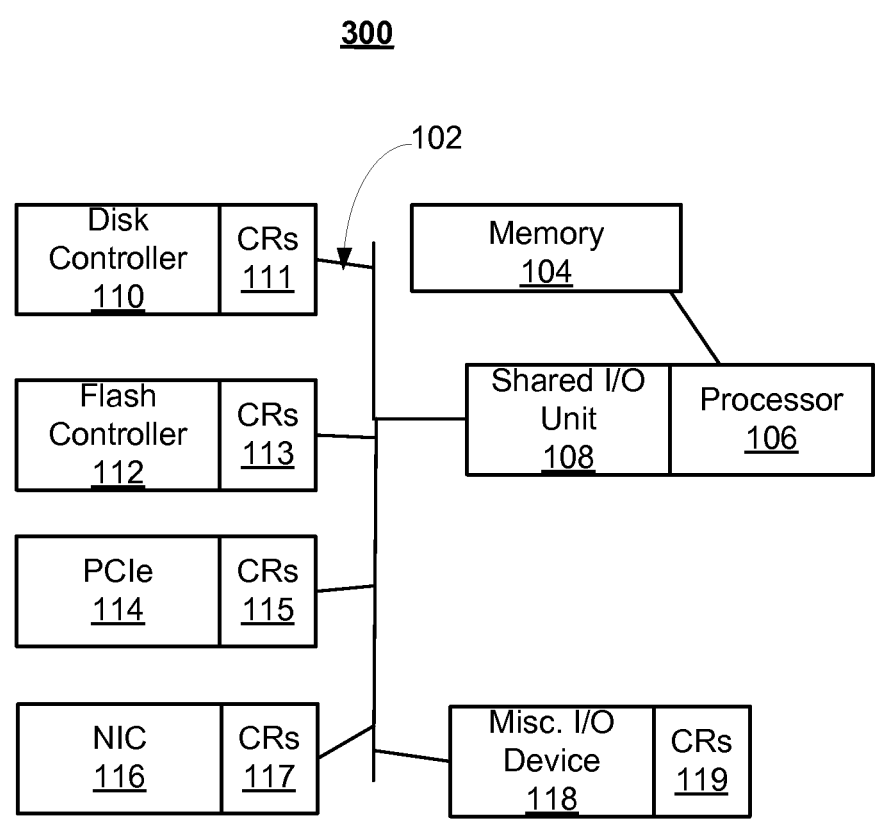
FIG. 3 is an example block diagram of a system having a shared I/O unit.

Other example implementations and variations to system 100 may be implemented using a shared I/O unit. Referring to FIG. 3, an example block diagram of a system 300 is illustrated. The system 300 may include the components and functionality of the system 100 of FIG. 1. In the system 300, the shared I/O unit 108 may not be a separate component, but instead may be a part of the processor 106. The shared I/O unit 108 may include all of the same components and functions, as described above with respect to FIG. 2.

Figure 4:
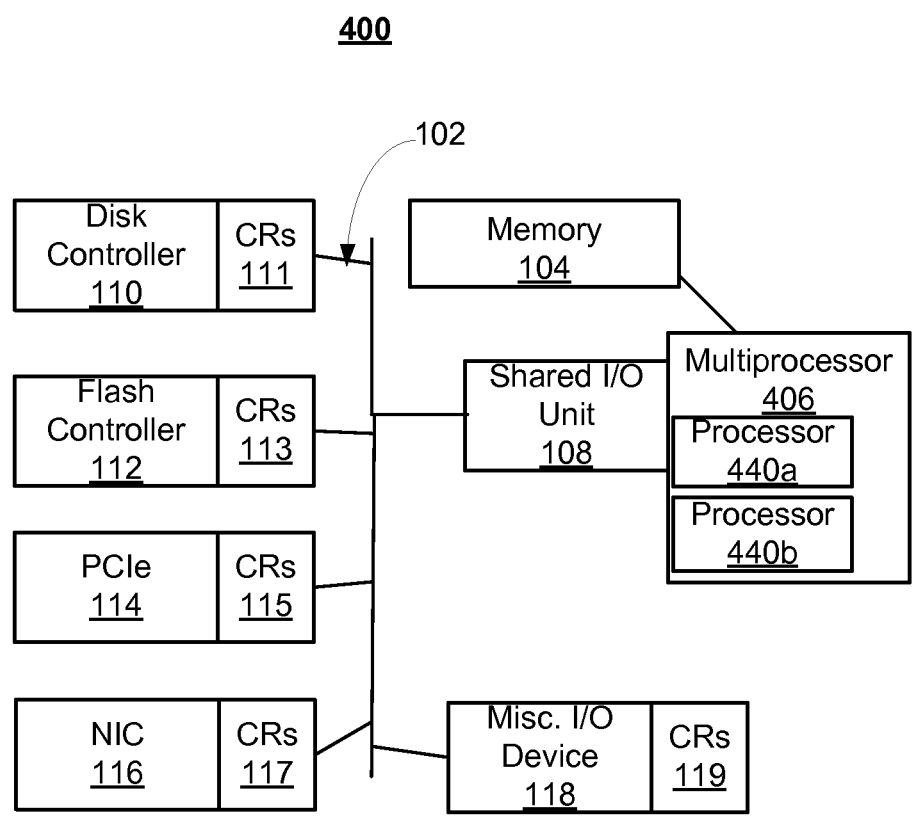
FIG. 4 is an example block diagram of a system having a shared I/O unit.

Referring to FIG. 4, an example block diagram of a system 400 is illustrated. The system 400 may be similar to the components and functionality of the system 100 of FIG. 1 and the system 300 of FIG. 3. The system 400 includes a multiprocessor 406 (e.g., a distributed shared memory (DSM) system or a symmetric multiprocessor (SMP) unit) having multiple processors 440a and 440b. The multiprocessor 406 includes at least a first processor 440a and at least a second processor 440b. The multiprocessor 406 may be a single chip unit or may be a multi-chip unit.

In the illustrated example, the shared I/O unit 108 may be a part of the multiprocessor 406. In other example implementations, the shared I/O unit 108 may be separate from the multiprocessor 406. In the system 400, the shared I/O unit 108 may function in the same manner as described above and provide and perform the shared common functions for the I/O devices 110-118. The system 400 may have more processing power at least, in part, due to the multiple processors 440a and 440b.

Figure 5:
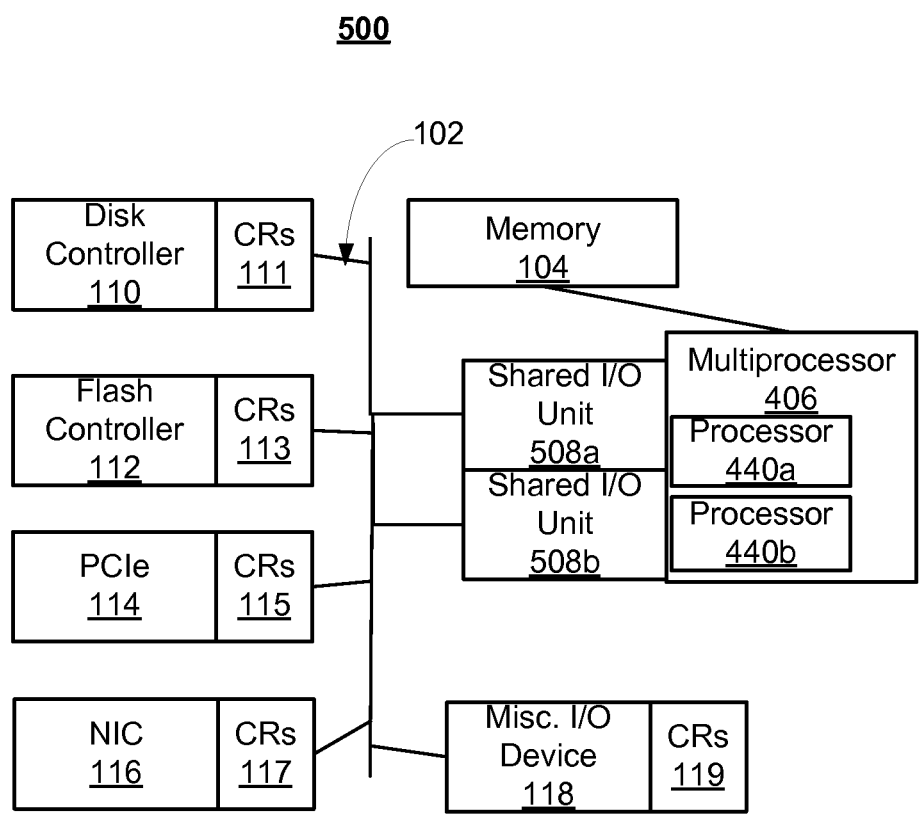
FIG. 5 is an example block diagram of a system having multiple shared I/O units.

Referring to FIG. 5, an example block diagram of a system 500 is illustrated. The system 500 may be similar to the components and functionality of the system 100 of FIG. 1, the system 300 of FIG. 3 and the system 400 of FIG. 4. The system 400 includes multiple shared I/O units 508a and 508b. The multiple shared I/O units 508a and 508b may include the same components and functions and be configured to function in the same manner as the shared I/O unit 108 described above with respect to FIGS. 1-4. The multiple shared I/O units 508a and 508b may provide additional redundancy and/or configuration options with respect to sharing the functions among the I/O devices 110-118 and the multiprocessor 406.

In one implementation, for example, a portion of the I/O devices 110-118 may share the functions with one of the shared I/O units such as shared I/O unit 508a. Another portion of the I/O devices 110-118 may share the functions with the other shared I/O unit 508b. In other example implementations, other configurations are possible.

In one example implementation, the shared I/O units 508a and 508b may be at a same location. In other example implementations, the shared I/O units 508a and 508b may be at different locations. In one example implementation, the shared I/O units 508a and 508b may include the same set of shared I/O functions. In other example implementations, the shared I/O units 508a and 508b may each include a portion of the shared I/O functions, either with or without the duplication of one or more of the shared I/O functions.

In the example implementations described and illustrated above, the I/O devices 110-118 may be peers with the processor 106 of FIGS. 1 and 3 and multiprocessor 406 of FIGS. 4 and 5. That is, the I/O devices 110-118 may not need an I/O interconnect between the I/O devices 110-118 and the processor and instead may communicate with each other on a peer-to-peer basis. The PCIe controller 114 may be configured to perform PCIe control functions for other devices and components (not shown) or outside of the system. The use of the shared I/O unit 108 may enable this peer-to-peer communications. In other example implementations, the I/O devices may communicate with the processor using an I/O interconnect, where the bus 102 may be the I/O interconnect and the PCIe controller 114 may provide the control functionality for the communications and data movement.

Figure 6:
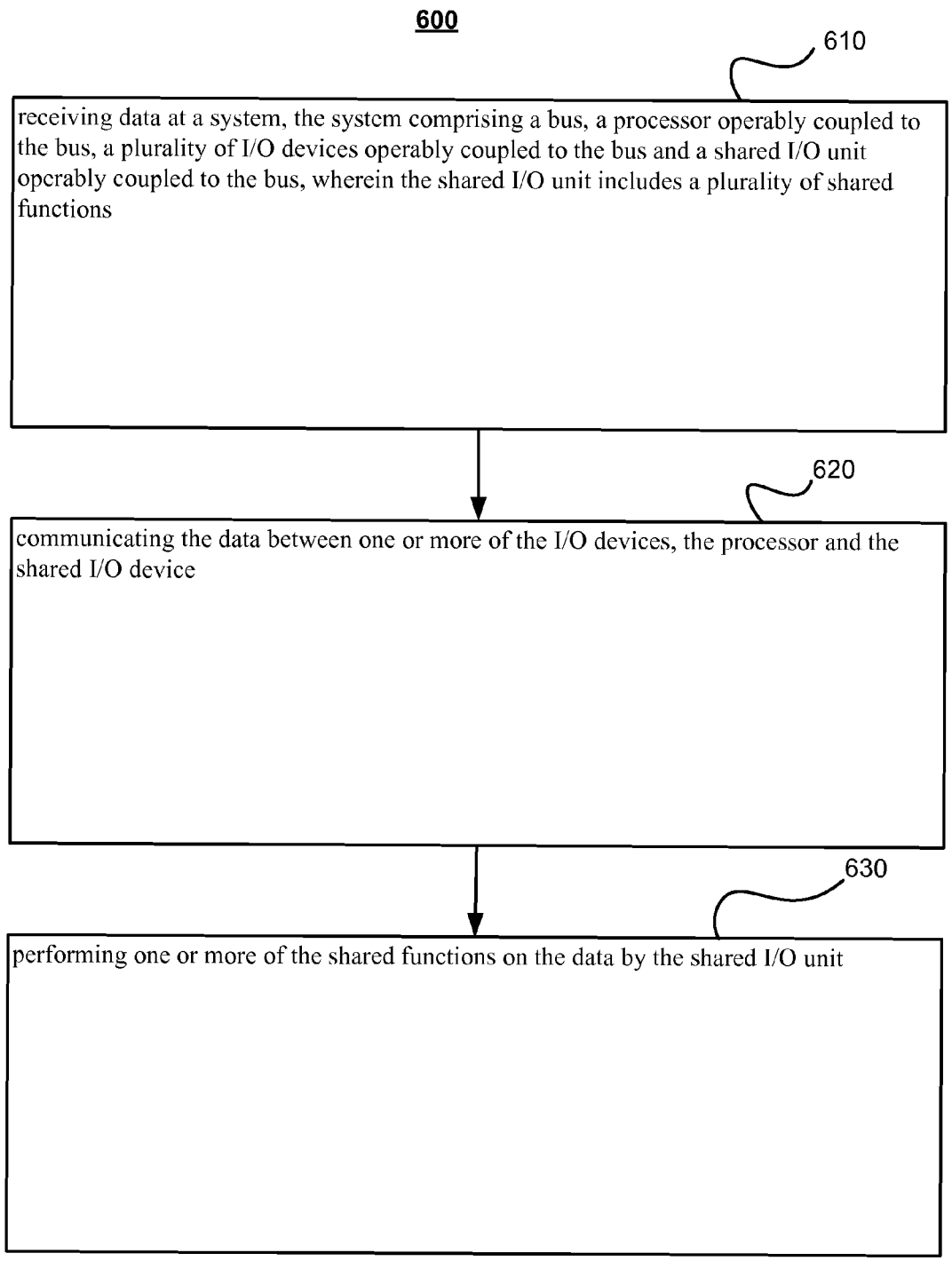
FIG. 6 is an example flowchart illustrating example operations of the systems of FIGS. 1-5.

Referring to FIG. 6, an example flowchart of a process 600 is illustrated. The process 600 may be performed by the systems and components described above with respect to FIGS. 1-5. Process 600 includes receiving data at a system (610). The system includes a bus, a processor operably coupled to the bus, a plurality of I/O devices operably coupled to the bus and a shared I/O unit operably coupled to the bus, where the shared I/O unit includes a plurality of shared functions (610).

Process 600 includes communicating the data between one or more of the I/O devices, the processor and the shared I/O device (620). Process 600 also includes performing one or more of the shared functions on the data by the shared I/O unit (630). The shared functions may not be included as functions on the I/O devices.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A system, comprising:
a bus;

a processor operably coupled to the bus;
a memory operably coupled to the bus;
a plurality of input/output (I/O) devices operably coupled to the bus, each of the I/O devices having a set of control registers; and
a first shared I/O unit operably coupled to the bus, the first shared I/O unit having a plurality of shared functions and configured to perform the shared functions, wherein the shared I/O functions are not included as functions on the I/O devices and the I/O devices and the processor interact with the first shared I/O unit to use one or more of the shared functions performed by the first shared I/O unit.

2. The system of claim 1 wherein the first shared I/O unit is a part of the processor.

3. The system of claim 1 wherein the first shared I/O unit is a component separate from the processor.

4. The system of claim 1 wherein the plurality of shared functions comprises one or more interrupt controllers, one or more I/O memory management units (MMUs), a plurality of data queues and a plurality of connection state structures.

5. The system of claim 4 wherein the plurality of shared functions further comprises one or more remote direct memory access (RDMA) engines and one or more acceleration engines.

6. The system of claim 1 wherein the bus comprises an I/O interconnect bus.

7. The system of claim 1 wherein one of the I/O devices comprises an I/O interconnect bus.

8. The system of claim 1 wherein the plurality of devices operate as peers to the processor.

9. The system of claim 1 wherein the processor is a multiprocessor (MP) having at least two processors.

10. The system of claim 1 further comprising:
a second shared I/O unit operably coupled to the bus, the second shared I/O unit having a same plurality of shared functions as the first shared I/O unit and configured to perform the shared functions, wherein the shared I/O functions are not included as functions on the I/O devices and a first portion of the I/O devices and the processor interact with the first shared I/O unit to use one or more of the shared functions performed by the first shared I/O unit and a second portion of the I/O devices and the processor interact with the second shared I/O unit to use one or more of the shared functions performed by the second shared I/O unit.

11. A system, comprising:
a bus;
a multiprocessor having at least two processors, the multiprocessor operably coupled to the bus;
a memory operably coupled to the bus;
a plurality of input/output (I/O) devices operably coupled to the bus;
a first shared I/O unit operably coupled to the bus, the first shared I/O unit comprising a plurality of shared functions and configured to perform the shared functions, wherein the I/O devices and the multiprocessor interact with the first shared I/O unit to use one or more of the shared functions performed by the first shared I/O unit, the shared I/O functions including one or more interrupt controllers, one or more I/O memory management units (MMUs), and a plurality of data queues.

12. The system of claim 11 wherein the I/O devices include a set of control registers and do not include the shared I/O functions.

13. The system of claim 11 wherein the plurality of shared functions further comprises one or more remote direct memory access (RDMA) engines, one or more acceleration engines and a plurality of connection state structures.

14. The system of claim 11 wherein the bus comprises an I/O interconnect bus.

15. The system of claim 11 wherein the first shared I/O unit is a component separate from the multiprocessor.

16. The system of claim 11 further comprising:
a second shared I/O unit operably coupled to the bus, the second shared I/O unit having a same plurality of shared functions as the first shared I/O unit and configured to perform the shared functions, wherein:
a first portion of the I/O devices and a first processor of the multiprocessor interact with the first shared I/O unit to use one or more of the shared functions performed by the first shared I/O unit, and
a second portion of the I/O devices and a second processor of the multiprocessor interact with the second shared I/O unit to use one or more of the shared functions performed by the second shared I/O unit.

17. The system of claim 11 wherein each of the plurality of I/O devices operates as a peer to the multiprocessor.

18. The system of claim 11 wherein one of the plurality of I/O devices comprises a network interface device.

19. A method for performing input/output (I/O) operations among a plurality of I/O devices, the method comprising:
receiving data at a system, the system comprising a bus, a processor operably coupled to the bus, a plurality of I/O devices operably coupled to the bus and a shared I/O unit operably coupled to the bus, wherein the shared I/O unit includes a plurality of shared functions;
communicating the data between one or more of the I/O devices, the processor and the shared I/O device; and
performing one or more of the shared functions on the data by the shared I/O unit.

20. The method of claim 19 wherein the shared I/O functions are not included as functions on the I/O devices.

* * * * *